(12) United States Patent
Izumi et al.

(10) Patent No.: US 10,641,101 B2
(45) Date of Patent: May 5, 2020

(54) BLADE AND GAS TURBINE PROVIDED WITH SAME

(71) Applicant: Mitsubishi Hitachi Power Systems, Ltd., Kanagawa (JP)

(72) Inventors: Yusuke Izumi, Yokohama (JP); Kazuki Morimoto, Yokohama (JP); Satoshi Hada, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 133 days.

(21) Appl. No.: 15/759,687

(22) PCT Filed: Sep. 14, 2016

(86) PCT No.: PCT/JP2016/077122
§ 371 (c)(1),
(2) Date: Mar. 13, 2018

(87) PCT Pub. No.: WO2017/056997
PCT Pub. Date: Apr. 6, 2017

(65) Prior Publication Data
US 2019/0040747 A1 Feb. 7, 2019

(30) Foreign Application Priority Data
Sep. 29, 2015 (JP) ................................. 2015-190696

(51) Int. Cl.
*F01D 5/18* (2006.01)
*F01D 5/20* (2006.01)

(52) U.S. Cl.
CPC ............. *F01D 5/186* (2013.01); *F01D 5/187* (2013.01); *F01D 5/20* (2013.01);
(Continued)

(58) Field of Classification Search
CPC .............. F01D 15/186; F01D 5/187; F05D 2220/3212; F05D 2240/301; F05D 2260/201; F05D 2260/202
(Continued)

(56) References Cited

U.S. PATENT DOCUMENTS 6,164,914 A * 12/2000 Correia .................... F01D 5/186
415/115
7,537,431 B1 * 5/2009 Liang ....................... F01D 5/187
415/115
(Continued)

FOREIGN PATENT DOCUMENTS

JP 62-223402 10/1987
JP 4636657 2/2011
(Continued)

OTHER PUBLICATIONS

International Search Report dated Nov. 22, 2016 in International (PCT) Application No. PCT/JP2016/077122, with English Translation.
(Continued)

*Primary Examiner* — J. Todd Newton
(74) *Attorney, Agent, or Firm* — Wenderoth, Lind & Ponack, L.L.P.

(57) ABSTRACT

A blade includes a blade body with a cooling flow passage through which a cooling medium is configured to flow. The blade body includes a top plate, and a thinning which is defined on a top surface of the top plate, closer to a suction side than a camber line, and which protrudes and extends along the camber line. A top plate flow passage is defined inside the top plate and includes an inlet flow passage which is closer to the suction side than the camber line and into which the cooling medium is configured to flow, a main flow passage which extends in a direction intersecting the camber line along the top surface, and an outlet flow passage through which the cooling medium is configured to be discharged to an outside of the blade body from a position closer to a pressure side than the camber line.

9 Claims, 7 Drawing Sheets

(52) U.S. Cl.
CPC ............... *F05D 2220/3212* (2013.01); *F05D 2240/301* (2013.01); *F05D 2240/307* (2013.01); *F05D 2250/185* (2013.01); *F05D 2260/201* (2013.01); *F05D 2260/202* (2013.01); *Y02T 50/676* (2013.01)

(58) Field of Classification Search
USPC .......................................................... 415/115
See application file for complete search history.

(56) References Cited

U.S. PATENT DOCUMENTS

| | | | |
|---|---|---|---|
| 10,012,089 B2 * | 7/2018 | Quach | ..................... F01D 5/187 |
| 10,053,992 B2 * | 8/2018 | Quach | ....................... F01D 5/20 |
| 2010/0111704 A1 * | 5/2010 | Hada | ......................... F01D 5/20 |
| | | | 416/97 R |
| 2010/0290921 A1 | 11/2010 | Mhetras | |
| 2013/0156600 A1 | 6/2013 | Bunker | |
| 2013/0315749 A1 | 11/2013 | Zhang et al. | |
| 2014/0178207 A1 | 6/2014 | He et al. | |

FOREIGN PATENT DOCUMENTS

| | | |
|---|---|---|
| JP | 2013-124665 | 6/2013 |
| JP | 2013-245674 | 12/2013 |
| WO | 2010/050261 | 5/2010 |
| WO | 2014/113162 | 7/2014 |
| WO | 2015/069411 | 5/2015 |

OTHER PUBLICATIONS

Written Opinion of the International Searching Authority dated Nov. 22, 2016 in International (PCT) Application No. PCT/JP2016/077122, with English Translation.

* cited by examiner

BLADE AND GAS TURBINE PROVIDED WITH SAME

CROSS-REFERENCE TO RELATED APPLICATION

Priority is claimed from Japanese Patent Application No. 2015-190696, filed on Sep. 29, 2015, the content of which is incorporated herein by reference.

TECHNICAL FIELD

The present invention relates to a blade and a gas turbine provided with the same.

BACKGROUND ART

A gas turbine includes a rotor which rotates about an axis and a casing which covers the rotor. The rotor includes a rotor shaft and a plurality of blades attached to the rotor shaft. A plurality of vanes are provided inside the casing.

Each of the blades includes a blade body which extends in a radial direction with respect to an axis, a platform provided inside the blade body in the radial direction, and a blade root provided inside the platform in the radial direction. The blade body of the blade is disposed in a combustion gas flow passage through which a combustion gas passes. The platform defines a position of the combustion gas flow passage on the inside in the radial direction. The blade root is fixed to the rotor shaft.

Airfoil bodies of the gas turbine such as the vanes and the blades are exposed to a high-temperature combustion gas. Accordingly, the blades of the gas turbine are cooled by causing a cooling medium to flow into the blades. For example, in each of blades described in Japanese Unexamined Patent Application, First Publication No. 2013-124665, a cooling channel through which a cooling medium flows is formed in a tip cap forming a top plate. In the tip cap, a tip rib as a thinning is provided on a radially outer end portion of a blade body substrate.

TECHNICAL SOLUTION

In the above-described blade, the cooling medium after cooling other portions passes through the vicinity of the tip rib as the thinning. As a result, when the cooling medium passes through the vicinity of the thinning, the temperature of the cooling medium has increased already, and thus, there is a possibility that the thinning cannot be sufficiently cooled. Therefore, it is preferable to effectively cool the thinning and the top plate by efficiently using the cooling medium.

SUMMARY OF INVENTION

The present invention provides a blade in which the thinning and the top plate can be effectively cooled by efficiently using a cooling medium and a gas turbine provided with the blade.

Solution to Problem

In order to achieve the above-described object, the present invention adopts the following means.

According to a first aspect of the present invention, a blade is provided, including a blade body inside which a cooling flow passage through which a cooling medium flows is formed. The blade body includes a top plate formed on a blade end portion of the blade body in a blade height direction, and a thinning which is formed on a top surface of the top plate facing an outside in the blade height direction, closer to a suction side of the blade body than a camber line of the blade body, and which protrudes toward the outside and extends along the camber line. A top plate flow passage through which the cooling medium from the cooling flow passage flows is formed inside the top plate, and the top plate flow passage includes an inlet flow passage which is formed closer to the suction side than the camber line and into which the cooling medium flows from the cooling flow passage, a main flow passage connected to the inlet flow passage and extending in a direction intersecting the camber line along the top surface, and an outlet flow passage which is connected to the main flow passage and through which the cooling medium is discharged to an outside of the blade body from a position closer to a pressure side of the blade body than the camber line.

According to this configuration, since the inlet flow passage is provided, it is possible to cool the thinning by using the cooling medium which has just flowed in from the cooling flow passage. That is, it is possible to cool the thinning by using the cooling medium before it flows through the main flow passage and thereby cools the top surface and a temperature thereof increases. In addition, the cooling medium after cooling the thinning can flow through the main flow passage, and thus, it is possible to cool the top surface by convection cooling. In addition, the cooling medium is discharged from the pressure side of the top surface, so that the cooling medium flows along the top surface from the pressure side toward the suction side so as to follow a flow of a combustion gas, and thus, film cooling can be performed. Accordingly, it is possible to efficiently use the cooling medium flowing through the top plate.

In a blade according to a second aspect of the present invention, in the first aspect, the inlet flow passage may be formed at a position closer to the thinning than the camber line when viewed in the blade height direction.

In a blade according to a third aspect of the present invention, in the first or second aspect, the outlet flow passage may be formed at a position closer to an outer surface of the blade body facing the pressure side than the camber line when viewed in the blade height direction.

In a blade according to a fourth aspect of the present invention, in any one of the first to third aspects, the main flow passage may be formed in a meandering manner in a cross section parallel to the top surface.

According to the configuration, the main flow passage can be formed to be lengthened inside the top plate. Accordingly, the cooling medium can flow over a wide range inside the top plate in a state where a flow rate of the cooling medium discharged to the outside of the top plate is decreased. Therefore, it is possible to increase a region cooled by convection cooling. Accordingly, the convection cooling is performed by efficiently using the cooling medium, and a wider range can be cooled.

In a blade according to a fifth aspect of the present invention, in any one of the first to fourth aspects, the top plate may include an inclined surface connecting a surface facing the pressure side of the blade body and the top surface to each other, and the outlet flow passage may be open at the inclined surface.

According to this configuration, the cooling medium discharged from the outlet flow passage to the outside of the top plate flows along the top surface without peeling. As a result, it is possible to improve efficiency of cooling performed by the cooling medium flowing on the top surface from the pressure side toward the suction side along the flow of the combustion gas. Accordingly, it is possible to cool the top plate by more efficiently using the cooling medium discharged from the outlet flow passage.

In a blade according to a sixth aspect of the present invention, in any one of the first to fifth aspects, a thinning flow passage through which the cooling medium flows may be formed inside the thinning.

According to this configuration, the cooling medium flows through the thinning flow passage formed inside the thinning, and thus, it is possible to intensively cool the thinning by convection cooling. Accordingly, in addition to the cooling being performed by the top plate flow passage, the cooling can be performed by the thinning flow passage, and thus, it is possible to more effectively cool the thinning.

In a blade according to a seventh aspect of the present invention, in any one of the first to sixth aspects, the inlet flow passage may include a cooling surface that is formed at a position at which the cooling surface at least partially overlaps the thinning when viewed in the blade height direction and that faces a side opposite to the outside in the blade height direction, and an injection portion in which an injection hole through which the cooling medium is injected to the cooling surface is formed.

According to this configuration, the thinning is cooled by performing impingement cooling, and thus, it is possible to more intensively cool the thinning That is, it is possible to more effectively cool the thinning using the cooling medium flowing through the top plate flow passage.

In a blade according to an eighth aspect of the present invention, in any one of the first to seventh aspects, the blade may further include a platform provided on an end portion of the blade body on the side opposite to the outside in the blade height direction.

According to a ninth aspect of the present invention, a gas turbine is provided, including: a combustor which generates a combustion gas; and a turbine which includes the blade according to any one of the first to eighth aspects.

According to this configuration, the cooling medium flows through the top plate flow passage, and thus, it is possible to cool the top plate and the thinning of the blade by efficiently using the cooling medium. Therefore, it is possible to decrease an amount of a portion of the compressed air as the cooling medium supplied to the turbine, and it is possible to improve efficiency of the gas turbine.

Advantageous Effects of Invention

According to the present invention, the cooling medium flows through the top plate flow passage, and thus, it is possible to effectively cool the thinning and the top plate by efficiently using the cooling medium.

DESCRIPTION OF EMBODIMENTS

First Embodiment

Hereinafter, an embodiment according to the present invention will be described with reference to FIGS. 1 to 5.

Figure 1:
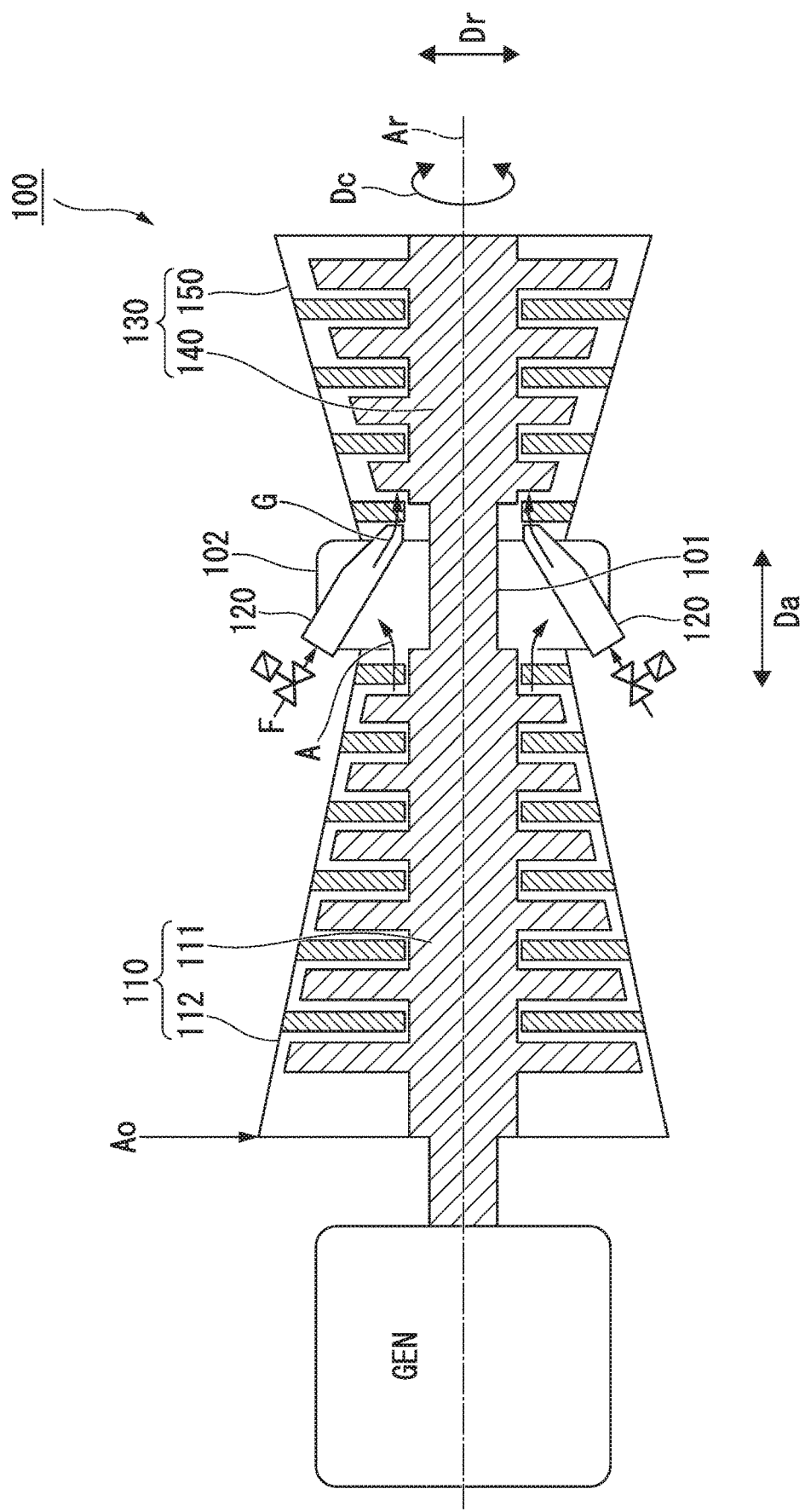
FIG. 1 is a schematic sectional view showing a gas turbine in an embodiment according to the present invention.

As shown in FIG. 1, a gas turbine 100 of the present embodiment includes a compressor 110, a plurality of combustors 120, and a turbine 130. The compressor 110 compresses outside air Ao to generate compressed air A. The plurality of combustors 120 combust a fuel F in the compressed air A to generate a combustion gas G. The turbine 130 is driven by the combustion gas G.

The compressor 110 includes a compressor rotor 111 which rotates about an axis Ar and a compressor casing 112 which covers the compressor rotor 111 so that the compressor rotor 111 is rotatable. The turbine 130 includes a turbine rotor 140 which rotates about the axis Ar and a turbine casing 150 which covers the turbine rotor 140 so that the turbine rotor 140 is rotatable. The axis Ar of the compressor rotor 111 and the axis Ar of the turbine rotor 140 are positioned on the same straight line. The compressor rotor 111 and the turbine rotor 140 are connected to each other, and thus, form a gas turbine rotor 101. The compressor casing 112 and the turbine casing 150 are connected to each other, and thus, form a gas turbine casing 102.

Hereinafter, a direction in which the axis Ar extends is referred to as an axial direction Da. A circumferential direction Dc with the axis Ar as the center is simply referred to as a circumferential direction Dc. A direction perpendicular to the axis Ar is referred to as a radial direction Dr.

For example, a rotor of a generator GEN is connected to the gas turbine rotor 101. The plurality of combustors 120 are arranged about the axis Ar in the circumferential direction Dc and are accommodated in the gas turbine casing 102. The combustors 120 are fixed to the gas turbine casing 102.

Figure 2:
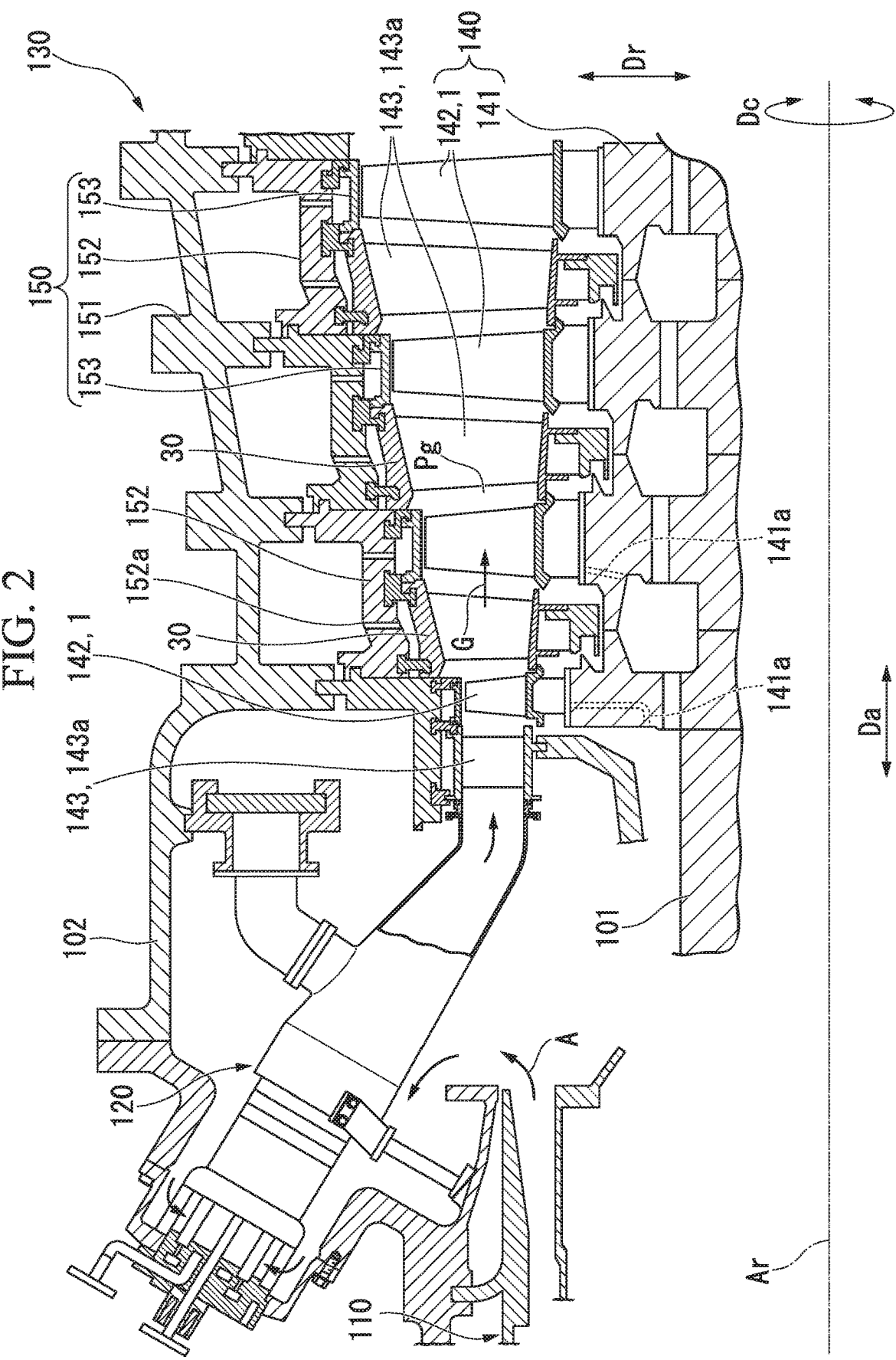
FIG. 2 is a main sectional view of the gas turbine in the embodiment according to the present invention.

As shown in FIG. 2, the turbine rotor 140 includes a rotor shaft 141 which extends in the axial direction Da about the axis Ar and a plurality of blade stages 142 attached to the rotor shaft 141. The plurality of blade stages 142 are arranged in the axial direction Da. Each of the blade stages 142 includes a plurality of blades 1 arranged in the circumferential direction Dc. A vane stage 143 is disposed on an upstream side of each of the plurality of blade stages 142. Each vane stage 143 is provided inside the turbine casing 150. Each of the vane stages 143 includes a plurality of vanes 143a arranged in the circumferential direction Dc.

The turbine casing 150 includes a tubular outer casing 151 which forms an outer shell of the turbine casing 150, an inner casing 152 fixed inside the outer casing 151, and a plurality of ring segments 153 fixed inside the inner casing 152. Each of the plurality of ring segments 153 is provided at a position between the plurality of vane stages 143. The blade stage 142 is disposed inside each ring segment 153 in the radial direction Dr.

An annular space in which the vanes 143a and the blades 1 are disposed in the axial direction Da between an outer peripheral side of the rotor shaft 141 and an inner peripheral side of the turbine casing 150 forms a combustion gas flow passage Pg through which a combustion gas G flows from the combustors 120. The combustion gas flow passage Pg forms an annular shape about the axis Ar. The combustion gas flow passage Pg extends in the axial direction Da in which the rotor shaft 141 extends.

In the rotor shaft 141, rotor coolant passages 141a through which a portion of the compressed air A as a cooling medium passes are formed. The cooling medium is introduced into the blades 1 through the rotor coolant passages 141a and is used to cool the blades 1.

In the inner casing 152 of the turbine casing 150, casing coolant passages 152a which penetrate the inner casing 152 from the outside in the radial direction Dr to the inside in the radial direction Dr are formed. The cooling medium is introduced into the vanes 143a and the ring segments 153 through the casing coolant passages 152a. The introduced cooling medium is used to cool the vanes 143a and the ring segments 153.

In some of the vane stages 143, air in the gas turbine casing 102 as the cooling medium may be supplied to the vanes 143a composing the vane stages 143 without going through the casing coolant passages 152a.

Hereinafter, an embodiment of the blade 1 according to the present invention will be described.

Figure 3:
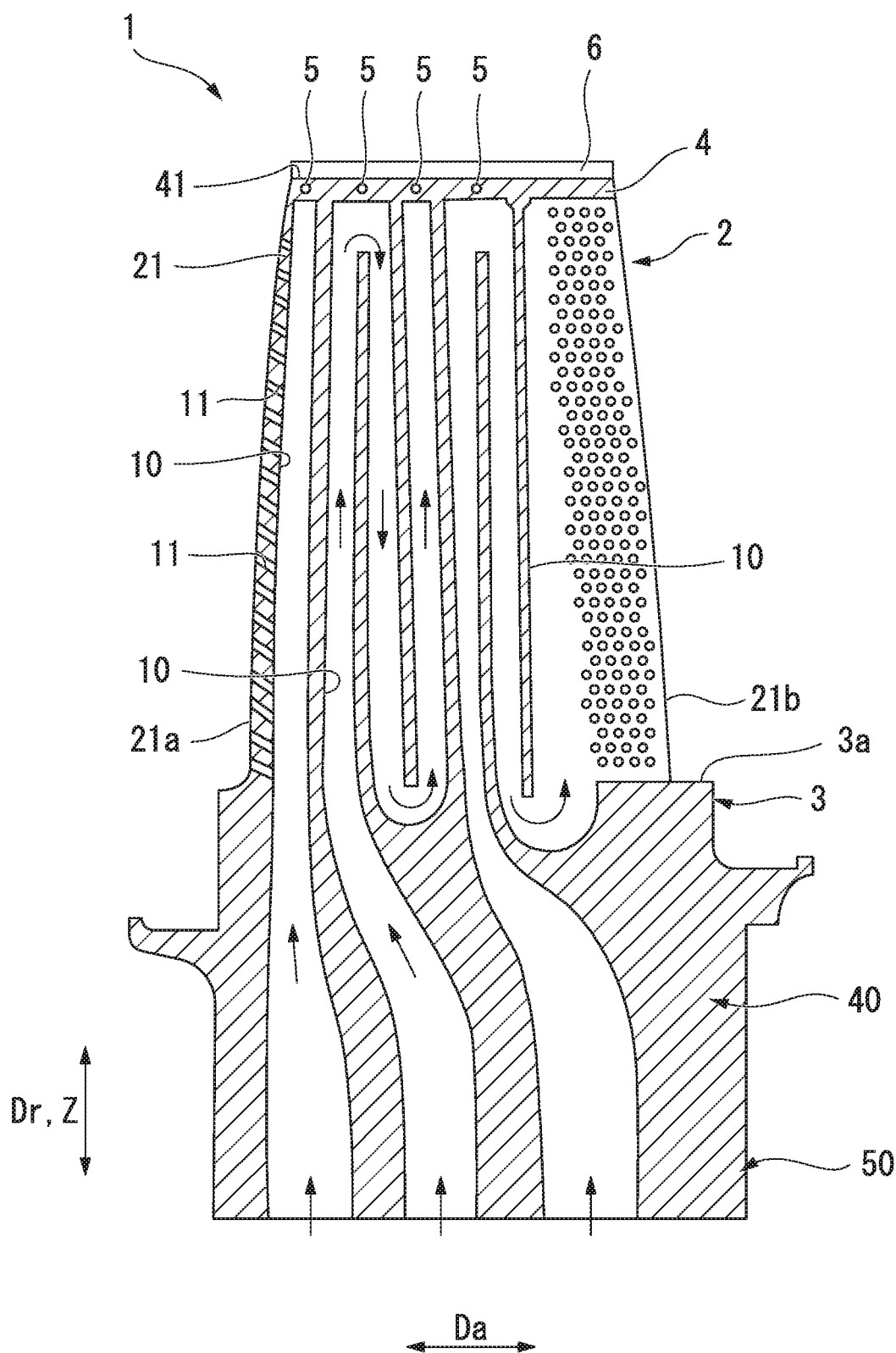
FIG. 3 is a sectional view of a blade in the embodiment according to the present invention.

As shown in FIG. 3, the blade 1 of the present embodiment includes a blade body 2, a platform 3, a shank 40, and a blade root 50. In the present embodiment, the blade body 2, the platform 3, the shank 40, and the blade root 50 are integrally molded.

The blade body 2 extends in the radial direction Dr. In the blade body 2, an outer surface 210 faces the combustion gas flow passage Pg and is exposed to the combustion gas G. A cooling flow passage 10 through which the cooling medium flows is formed inside the blade body 2.

As shown in FIG. 3, a plurality of cooling flow passages 10 extend in the radial direction Dr and are formed inside the blade body 2. The plurality of cooling flow passages 10 are continuously formed at least from the blade body 2 to the platform 3 among the blade body 2, the platform 3, the shank 40, and the blade root 50. The plurality of cooling flow passages 10 are arranged in the axial direction Da of the blade body 2. Some of the adjacent cooling flow passages 10 are connected to each other at an outer portion in the blade body 2 in the radial direction Dr or an inner portion of the platform 3 in the radial direction Dr. At least one of the plurality of cooling flow passages 10 is open at an inner end of the blade root 50 in the radial direction Dr. The cooling medium which has passed through the rotor coolant passages 141a of the rotor shaft 141 flows into the cooling flow passages 10 from the openings. A plurality of leading edge portion opening holes 11 open at a leading edge portion 21a of a blade main body 21 are formed in the most upstream-side cooling flow passage 10 among the plurality of cooling flow passages 10.

Figure 4:
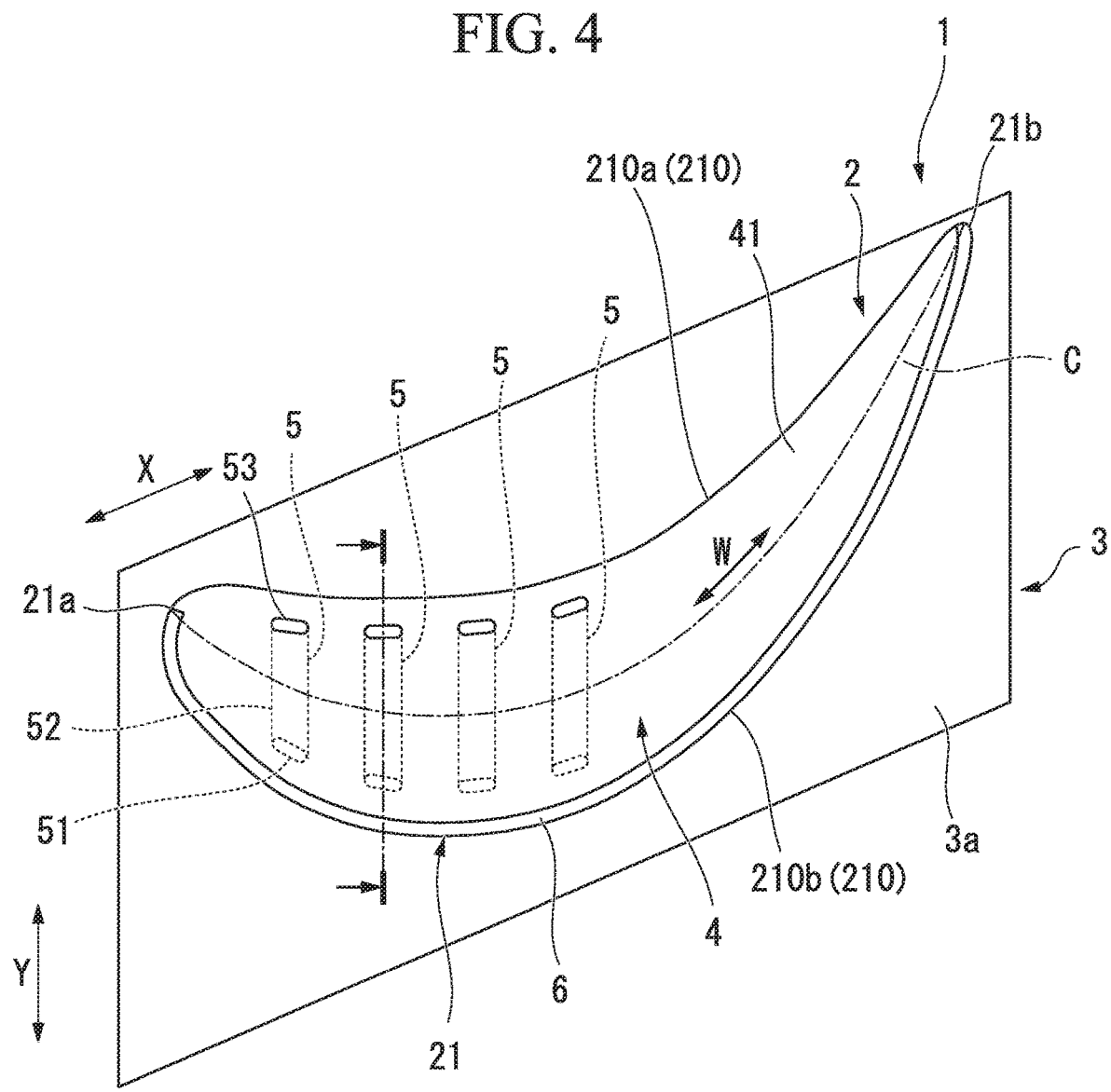
FIG. 4 is a view of the blade as viewed from an outside in a radial direction, illustrating a top plate flow passage of a first embodiment.

The platform 3 is provided on one end portion (first end portion) of the blade body 2, which is a base end side of the blade body 2 in a blade height direction Z. Specifically, the platform 3 is formed inside the blade body 2 in the radial direction Dr. As shown in FIG. 4, when viewed in the radial direction Dr, the platform 3 has a parallelogram shape. The platform 3 is positioned between the blade body 2 and the shank 40. A gas pass surface 3a which is an outer surface in the radial direction Dr is formed in the platform 3, and constitutes a portion of the combustion gas flow passage Pg on the inside in the radial direction Dr.

Here, the blade height direction Z of the blade body 2 is defined as a direction in which the blade body 2 extends, and in the present embodiment, which is the radial direction Dr (an up-down direction on a paper surface of FIG. 3). That is, one side in the blade height direction Z of the present embodiment is the inside in the radial direction Dr. The other side in the blade height direction Z is the outside in the radial direction Dr.

In the present embodiment, a chord direction X of the blade body 2 is defined as a direction orthogonal to the radial direction Dr and as a direction (a right-left direction on the paper surface of FIG. 3) parallel to surfaces of the platform 3 facing the circumferential direction Dc including a direction in which a chord of the blade body 2 extends. In the present embodiment, a blade thickness direction Y of the blade body 2 is defined as a direction orthogonal to the radial direction Dr and the chord direction X and as a thickness direction (a depth direction on the paper surface of FIG. 3) of the blade body 2.

A blade surface direction W of the blade body 2 is a direction along a camber line C and is a direction including a component in the chord direction X. That is, the blade surface direction W is a direction in which the camber line C extends in a cross section orthogonal to the blade height direction Z. The camber line C is a virtual line obtained by connecting points equidistant from a suction-side outer surface 210b and a pressure-side outer surface 210a to each other and is the center line of an airfoil shape when the blade body 2 is viewed in the blade height direction Z.

The shank 40 is formed inside the platform 3 in the radial direction Dr. That is, the shank 40 is disposed between the platform 3 and the blade root 50. The shank 40 connects the platform 3 and the blade root 50 to each other.

The blade root 50 is formed inside the shank 40 in the radial direction Dr. The blade root 50 has a Christmas tree shape in a cross section perpendicular to the axial direction Da that is formed by alternately and repeatedly increasing and decreasing the width toward the inside in the radial direction Dr. A blade root groove (not shown) into which the blade root 50 is fitted is formed in the rotor shaft 141.

The blade body 2 of the present embodiment includes the blade main body 21, a top plate 4, and a thinning 6.

The blade main body 21 forms an outer shell of the blade body 2. As shown in FIG. 4, a cross-sectional shape of the blade main body 21 orthogonal to the blade height direction Z is an airfoil shape. In the blade main body 21, a front end portion in the chord direction X forms the leading edge portion 21a. In the blade main body 21, a rear end portion in the chord direction X forms a trailing edge portion 21b. Of the outer surfaces 210 of the blade main body 21 facing the blade thickness direction Y, a convex outer surface 210 forms the suction-side outer surface 210b (=negative pressure surface). Of the outer surfaces 210 of the blade main body 21 facing the blade thickness direction Y, a concave outer surface 210 forms the pressure-side outer surface 210a (=positive pressure surface).

The top plate 4 is formed on the other blade end portion (second end portion), which is a tip side of the blade main body 21 in the blade height direction Z. As shown in FIG. 3, the top plate 4 forms an outer apex portion of the blade body 2 in the radial direction Dr. The top plate 4 closes the other side of the blade main body 21 in the blade height direction Z. Top plate flow passages 5 through which the cooling medium flows from the cooling flow passages 10 are formed inside the top plate 4. In the present embodiment, the top plate 4 has a flat plate shape. In the top plate 4, a top surface 41 facing the outside in the radial direction Dr, which is the other side of the blade main body 21 in the blade height direction Z, is formed.

The thinning 6 protrudes from the top surface 41 toward the other side in the blade height direction Z. In the present embodiment, as shown in FIG. 4, the thinning 6 is formed closer to the suction side than the camber line C of the blade body 2. The thinning 6 extends along the camber line C. In the present embodiment, the thinning 6 has a rectangular shape in a cross section and extends along the suction-side outer surface 210b in the blade surface direction W. A surface of the thinning 6 facing the suction side is formed to be continuous to the suction-side outer surface 210b.

Figure 5:
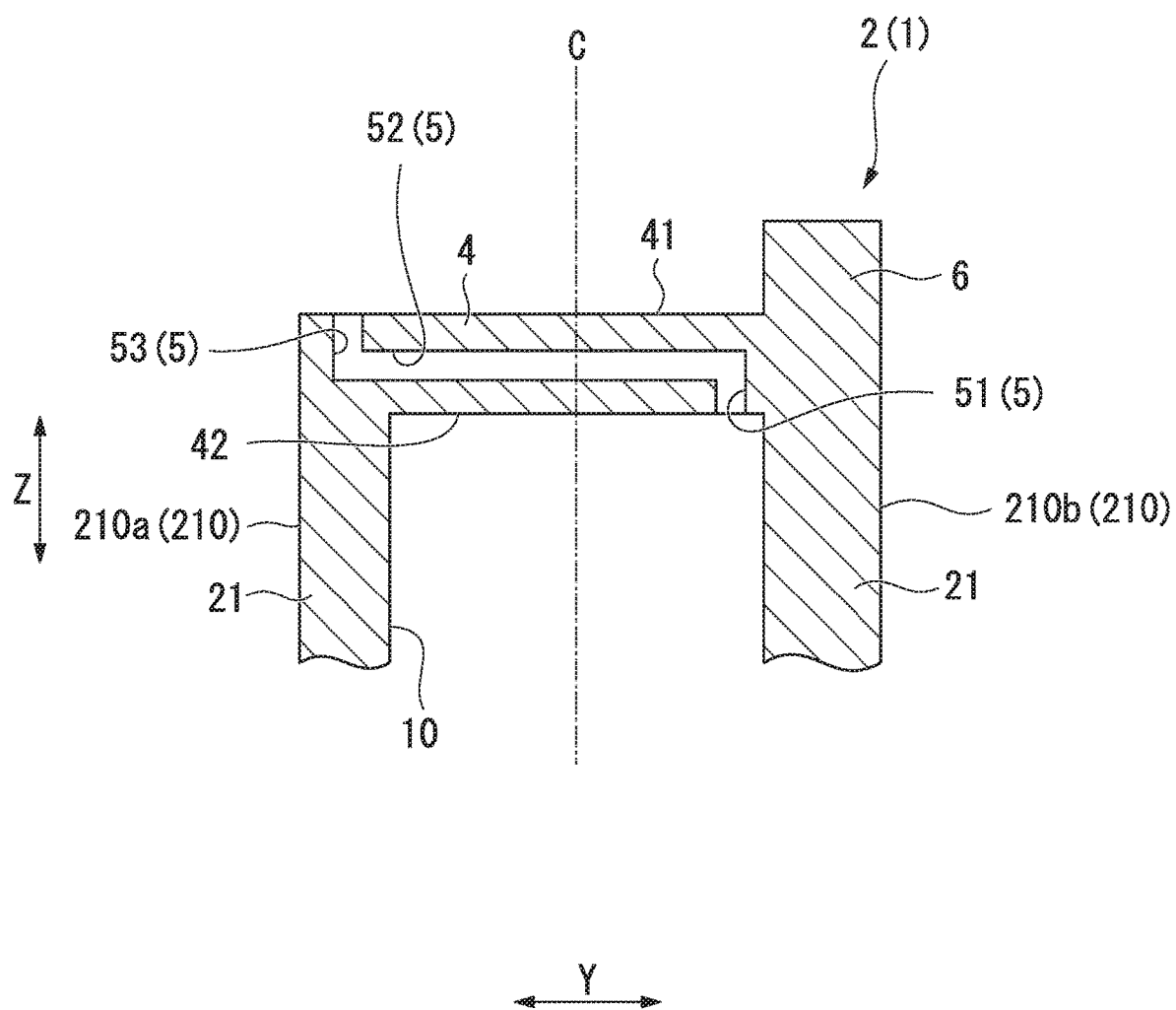
FIG. 5 is a sectional view of a top plate in a cross section orthogonal to a camber line, illustrating the top plate flow passage in the first embodiment.

The cooling medium flowing through the cooling flow passages 10 flows into the top plate flow passages 5. In the present embodiment, a plurality of top plate flow passages 5 are formed to be arranged in the blade surface direction W along the top surface 41. In the present embodiment, four top plate flow passages 5 are arranged in the blade surface direction W. As shown in FIG. 5, each of the top plate flow passages 5 includes an inlet flow passage 51 into which the cooling medium flows from the cooling flow passage 10, a main flow passage 52 connected to the inlet flow passage 51, and an outlet flow passage 53 through which the cooling medium is discharged to the outside of the blade body 2.

The inlet flow passage 51 is formed closer to the suction side than the camber line C. The inlet flow passage 51 is open at an inner surface 42 of the top plate 4 facing one side in the blade height direction Z that is a side opposite to the outside in the radial direction Dr. The inner surface 42 of the top plate 4 is a surface facing a side opposite to the top surface 41 and is parallel to the top surface 41. In the present embodiment, the inlet flow passage 51 extends to be perpendicular to the inner surface 42. In a cross section orthogonal to the camber line C, the inlet flow passage 51 is formed at a position at which a distance in the blade thickness direction Y to a suction-side wall portion of the blade main body 21 is shorter than a distance in the blade thickness direction Y to the camber line C. In addition, in the present embodiment, the inlet flow passage 51 is formed at the position closer to the thinning 6 than the camber line C when viewed in the blade height direction Z.

The main flow passage 52 extends in a direction intersecting the camber line C along the top surface 41. The main flow passage 52 is connected to the inlet flow passage 51 at a position closer to the suction side than the camber line C. In the present embodiment, the main flow passage 52 extends across the camber line C from the suction side toward the pressure side in the blade thickness direction Y. Specifically, as shown in FIG. 4, the main flow passage 52 extends linearly in the blade thickness direction Y intersecting the camber line C in a cross section parallel to the top surface 41. As shown in FIG. 5, the main flow passage 52 is formed inside the top plate 4 at a position at which a distance from the top surface 41 and a distance from the inner surface 42 are approximately the same as each other.

The outlet flow passage 53 is formed closer to the pressure side than the camber line C. The outlet flow passage 53 is open at the top surface 41. In the present embodiment, the outlet flow passage 53 extends to be perpendicular to the top surface 41. In the cross section orthogonal to the camber line C, the outlet flow passage 53 is formed at a position where a distance in the blade thickness direction Y to the pressure-side outer surface 210a is shorter than a distance in the blade thickness direction Y to the camber line C. Specifically, when viewed in the blade height direction Z, the outlet flow passage 53 is formed at a position at which the outlet flow passage 53 overlaps a wall portion forming the pressure-side outer surface 210a of the blade main body 21. The outlet flow passage 53 is formed at the same position in the blade surface direction W as the inlet flow passage 51. Moreover, in the present embodiment, when viewed in the blade height direction Z, the outlet flow passage 53 is formed at the position closer to the pressure-side outer surface 210a than the camber line C.

The outlet flow passage 53 is not limited to extending to be perpendicular to the top surface 41 as in the first embodiment, as long as the outlet flow passage 53 is open at the top surface 41. For example, the outlet flow passage 53 may extend to be inclined to the top surface 41. Similarly, the inlet flow passage 51 is not limited to extending to be perpendicular to the inner surface 42 as long as the inlet flow passage 51 communicates with the cooling flow passage 10. For example, the inlet flow passage 51 may extend to be inclined to the inner surface 42 or may be open at a side wall facing the suction-side outer surface 210b of the blade main body 21.

According to the gas turbine 100 of the first embodiment, as shown in FIG. 1, the compressed air A from the compressor 110 enters the gas turbine casing 102 and flows into the combustors 120. In the combustors 120, the compressed air A and the fuel F supplied from the outside are combusted, and thus, the combustion gas G is generated. While the combustion gas G passes through the combustion gas flow passage Pg, the combustion gas G comes into contact with the blades 1 and rotates the turbine rotor 140 about the rotor shaft 141.

As shown in FIG. 2, a portion of the compressed air A from the compressor 110 flows into the rotor coolant passage 141a or the casing coolant passage 152a as the cooling medium to cool the blades 1 or the vanes 143a. The cooling medium which has flowed into the casing coolant passages 152a cools the vanes 143a from the inside.

As shown in FIG. 3, the cooling medium which has flowed into the rotor coolant passages 141a flows into the cooling flow passage 10 which is open at the inner end of the blade root 50 in the radial direction Dr among the plurality of cooling flow passages 10 formed in each blade 1. While the cooling medium which has flowed into the cooling flow passage 10 passes through the plurality of cooling flow passages 10, the cooling medium exchanges heat with the blade body 2 or the like to cool the blade body 2 or the like and cools the blade 1 from the inside.

As shown in FIG. 5, the cooling medium flowing through the cooling flow passage 10 flows into the plurality of top plate flow passages 5 formed in the top plate 4. Specifically, the cooling medium flowing through the cooling flow passage 10 flows into the inlet flow passage 51 from the opening formed in the inner surface 42. The cooling medium flows through the inlet flow passage 51, and thus, convection cooling is performed between the thinning 6 and the top plate 4 formed at the position close to the inlet flow passage 51 and the cooling medium. Thereafter, the cooling medium which has flowed through the inlet flow passage 51 flows through the main flow passage 52 from the suction side to the pressure side in the blade thickness direction Y. The cooling medium flows through the main flow passage 52, and thus, convection cooling is performed between the top plate 4 and the cooling medium. Thereafter, the cooling medium flows through the outlet flow passage 53 and is discharged from the opening formed in the top plate 4 to the outside of the top plate 4. The cooling medium discharged to the outside of the top plate 4 flows along the top surface 41 together with the surrounding combustion gas G and performs film cooling to cool the top surface 41.

According to the blade 1 of the above-described first embodiment, in the top plate flow passage 5, the inlet flow passage 51 is formed at the position closer to the suction side, on which the thinning 6 is formed, than the camber line C. Therefore, since the inlet flow passage 51 is provided, it is possible to cool the thinning 6 by using the cooling medium which has just flowed in from the cooling flow passage 10. That is, by using the cooling medium before it flows through the main flow passage 52 and thereby a temperature thereof increases, it is possible to cool the thinning 6 to a lower temperature.

In addition, the main flow passage 52 extends across the camber line C from the suction side toward the pressure side in the blade thickness direction Y. Therefore, the cooling medium after cooling the thinning 6 can flow in the blade thickness direction Y along the top surface 41 by the main flow passage 52. As a result, it is possible to cool the top surface 41 in the blade thickness direction Y by the convection cooling.

The cooling medium after the convection cooling flows through the outlet flow passage 53, and thus, the cooling medium is discharged from the opening formed on the pressure side of the top surface 41 to the outside of the blade body 2. The blade body 2 rotates about the rotor shaft 141 from the suction side toward the pressure side. Accordingly, the combustion gas G flows around the top surface 41 from the pressure side toward the suction side. Therefore, the cooling medium is discharged from the opening formed on the pressure side of the top surface 41, and thus, the cooling medium can flow so as to follow the flow of the combustion gas G. Accordingly, the cooling medium flows along the top surface 41 so as to form a film in the blade thickness direction Y from the pressure side toward the suction side, and thus, it is possible to perform film cooling.

Therefore, the cooling medium flows through the top plate flow passage 5, and thus, it is possible to cool the top plate 4 by effectively using the cooling medium flowing inside the top plate 4. As a result, the thinning 6 is effectively cooled by efficiently using the cooling medium, and at the same time, it is possible to cool the top plate 4 by efficiently using the cooling medium.

According to the above-described gas turbine 100, the cooling medium flows through the top plate flow passage 5, and thus, it is possible to cool the top plate 4 and the thinning 6 of the blade 1 by efficiently using the cooling medium. Accordingly, it is possible to decrease an amount of a portion of the compressed air A as the cooling medium supplied to the turbine 130, and it is possible to improve efficiency of the gas turbine 100.

Second Embodiment

Next, a blade of a second embodiment will be described with reference to FIG. 6.

In the second embodiment, the same reference numerals are assigned to components similar to those of the first embodiment, and detailed descriptions thereof are omitted. In the blade of the second embodiment, a configuration of a top plate flow passage is different from that of the first embodiment.

Figure 6:
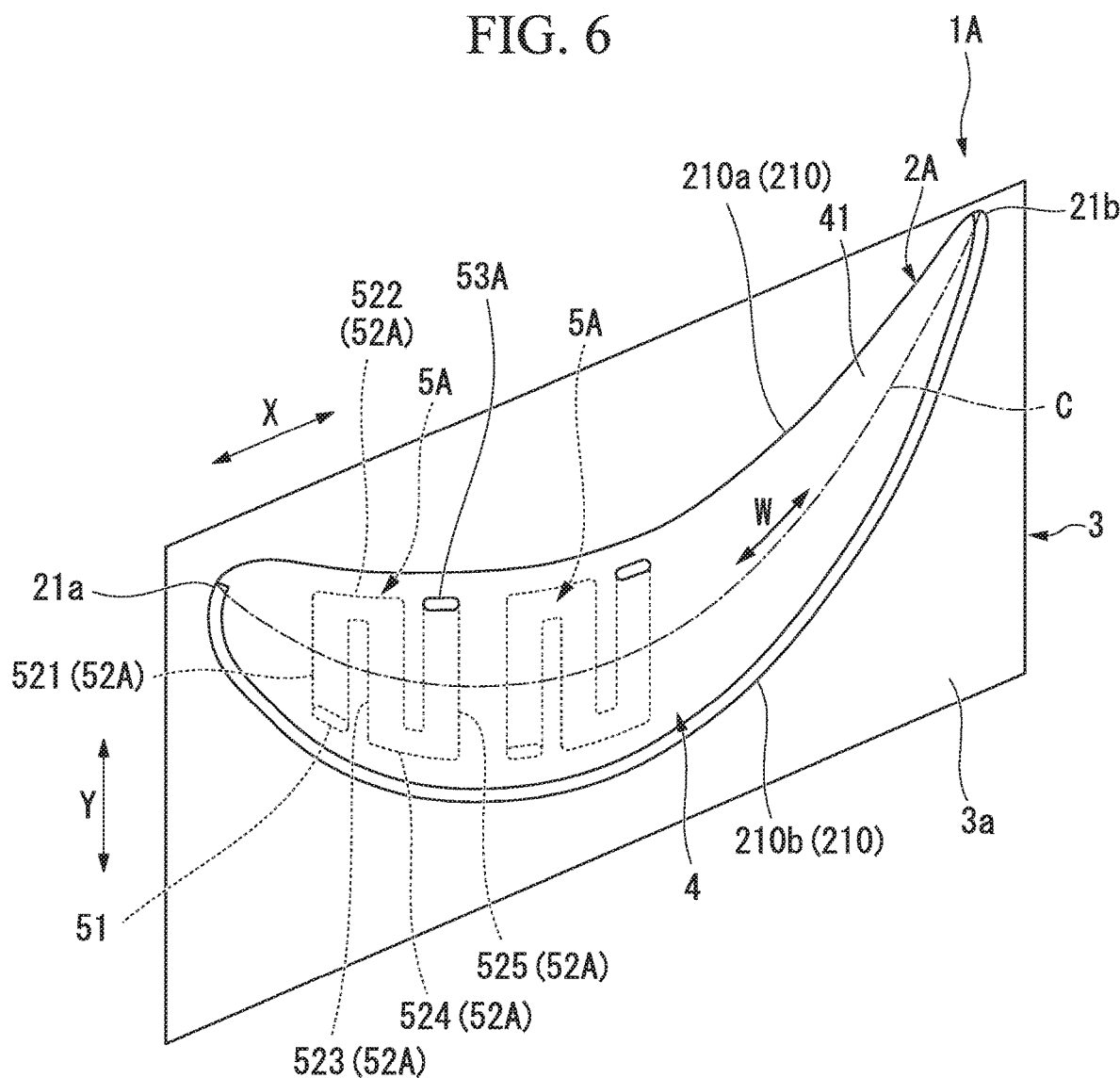
FIG. 6 is a view of the blade as viewed from the outside in the radial direction, illustrating a top plate flow passage of a second embodiment.

As shown in FIG. 6, in a top plate flow passage 5A of a blade 1A of the second embodiment, in a cross section parallel to the top surface 41, a main flow passage 52A is formed in a meandering manner. In the blade body 2 of the second embodiment, two top plate flow passages 5A are arranged in the blade surface direction W. Each top plate flow passage 5A includes the inlet flow passage 51 into which the cooling medium flows from the cooling flow passage 10, the main flow passage 52A connected to the inlet flow passage 51, and an outlet flow passage 53A through which the cooling medium is discharged to the outside of the blade body 2A.

The inlet flow passage 51 of the second embodiment is formed similarly to that of the first embodiment.

The outlet flow passage 53A of the second embodiment is formed at a position shifted from the inlet flow passage 51 in the blade surface direction W.

The main flow passage 52A of the second embodiment meanders in the blade thickness direction Y in the cross section parallel to the top surface 41. The main flow passage 52A includes a first straight line portion 521, a first return portion 522, a second straight line portion 523, a second return portion 524, and a third straight line portion 525.

The first straight line portion 521 is connected to the inlet flow passage 51 at a position closer to the suction side than the camber line C. The first straight line portion 521 extends in a direction intersecting the camber line C along the top surface 41. The first straight line portion 521 extends across the camber line C from the inlet flow passage 51 toward the pressure side in the blade thickness direction Y. Specifically, the first straight line portion 521 extends linearly in the blade thickness direction Y intersecting the camber line C in the cross section parallel to the top surface 41.

The first return portion 522 turns the flow of the cooling medium toward the pressure side in the blade thickness direction Y into the flow toward the suction side in the blade thickness direction Y. The first return portion 522 is connected to the first straight line portion 521 and the second straight line portion 523 at a position closer to the pressure side than the camber line C. After the first return portion 522 extends toward the pressure side in the blade thickness direction Y, the first return portion 522 extends to be curved toward the suction side in the blade thickness direction Y. Specifically, the first return portion 522 has a U shape in the cross section parallel to the top surface 41. That is, the first return portion 522 inverts a flow direction of the cooling medium flowing through the first straight line portion 521 by 180°.

The second straight line portion 523 is connected to the first return portion 522 at a position closer to the pressure side than the camber line C. The second straight line portion 523 extends in the direction intersecting the camber line C along the top surface 41. The second straight line portion 523 extends across the camber line C from the first return portion 522 toward the suction side in the blade thickness direction Y. Specifically, the second straight line portion 523 extends linearly in the blade thickness direction Y intersecting the camber line C in the cross section parallel to the top surface 41. The second straight line portion 523 is formed to be arranged at an interval in the blade surface direction W with respect to the first straight line portion 521.

The second return portion 524 returns the flow of the cooling medium toward the suction side in the blade thickness direction Y into the flow toward the pressure side in the blade thickness direction Y. The second return portion 524 is connected to the second straight line portion 523 and the third straight line portion 525 at a position closer to the suction side than the camber line C. After the second return portion 524 extends toward the suction side in the blade thickness direction Y, the second return portion 524 extends to be curved toward the pressure side in the blade thickness direction Y. Specifically, the second return portion 524 has a U shape in the cross section parallel to the top surface 41. That is, the second return portion 524 inverts the flow direction of the cooling medium flowing through the second straight line portion 523 by 180°.

The third straight line portion 525 is connected to the second return portion 524 at a position closer to the suction side than the camber line C. The third straight line portion 525 is connected to the outlet flow passage 53A at a position closer to the pressure side than the camber line C. The third straight line portion 525 extends in the direction intersecting the camber line C along the top surface 41. The third straight line portion 525 extends across the camber line C from the second return portion 524 toward the pressure side in the blade thickness direction Y. Specifically, the third straight line portion 525 extends linearly in the blade thickness direction Y intersecting the camber line C in the cross section parallel to the top surface 41. The third straight line portion 525 is formed to be arranged at an interval in the blade surface direction W with respect to the second straight line portion 523.

According to the blade 1A of the above-described second embodiment, the main flow passage 52A of the top plate flow passage 5A is formed in a meandering manner in the blade surface direction W. As a result, the main flow passage 52A can be formed to be lengthened inside the top plate 4. Accordingly, the cooling medium can flow over a wide range inside the top plate 4 in a state where a flow rate of the cooling medium discharged to the outside of the top plate 4 is decreased. Specifically, the cooling medium flowing in from the inlet flow passage 51 flows through the first straight line portion 521 from the suction side to the pressure side. Thereafter, the flow direction of the cooling medium is inverted by the first return portion 522, and thus, the cooling medium flows through the second straight line portion 523 from the pressure side to the suction side. Thereafter, the flow direction of the cooling medium is inverted again by the second return portion 524, and thus, the cooling medium flows through the third straight line portion 525 from the suction side toward the pressure side. That is, it is possible to increase a region cooled by convection cooling between the inlet flow passage 51 formed closer to the suction side than the camber line C and the outlet flow passage 53A formed closer to the pressure side than the camber line C. Accordingly, the convection cooling is performed by efficiently using the cooling medium, and a wider range can be cooled.

The main flow passage 52A of the second embodiment is not limited to meandering in the blade surface direction W as long as it is formed in a meandering manner in the cross section parallel to the top surface 41. For example, the main flow passage 52A may meander in the chord direction X or may meander in the blade surface direction W along the camber line C.

Third Embodiment

Next, a blade of a third embodiment will be described with reference to FIG. 7.

In the third embodiment, the same reference numerals are assigned to components similar to those of the first and second embodiments, and detailed descriptions thereof are omitted. In the blade of the third embodiment, a shape of a top plate and a configuration of a thinning are different from those of the first and second embodiments.

Figure 7:
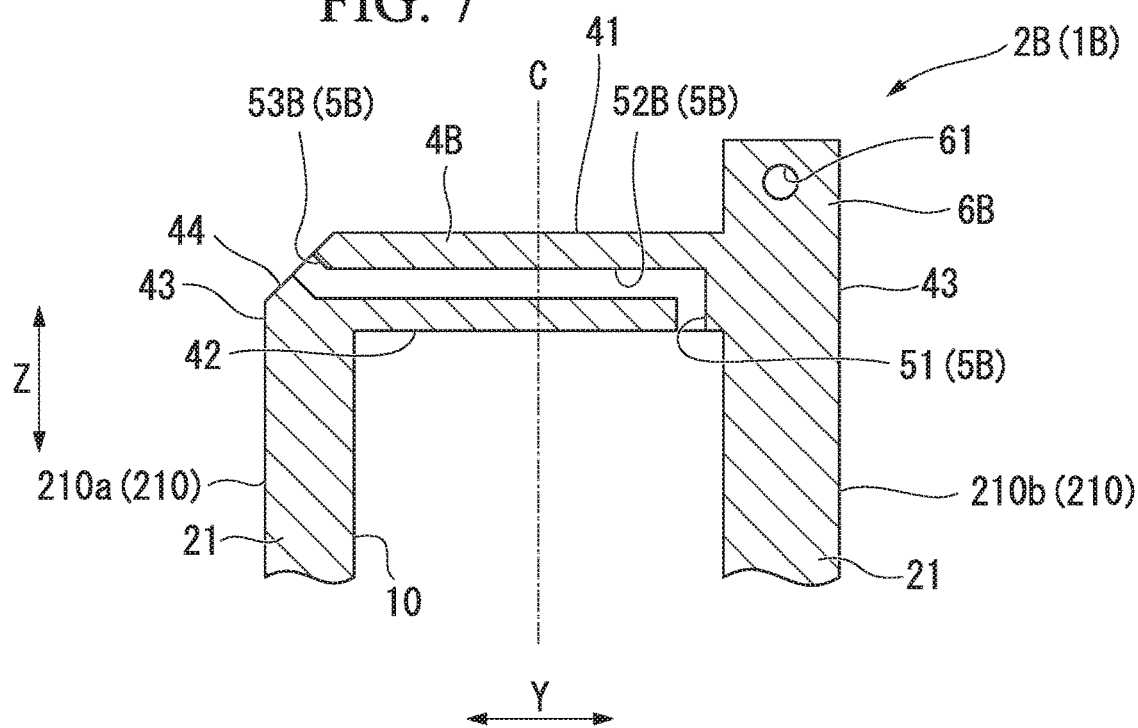
FIG. 7 is a sectional view of the top plate in the cross section orthogonal to the camber line, illustrating a top plate flow passage in a third embodiment.

As shown in FIG. 7, in a blade body 2B of a blade 1B of the third embodiment, a top plate 4B includes an inclined surface 44 connecting the top surface 41 and a side surface 43 of the top plate 4B facing the pressure side to each other. The inclined surface 44 is formed at a corner portion on the pressure side of the top plate 4B. The inclined surface 44 is inclined toward one side (the inside in the radial direction Dr) in the blade height direction Z as it extends toward the pressure side in the blade thickness direction Y. The inclined surface 44 of the third embodiment is inclined at 45° with respect to the top surface 41 and the side surface 43.

In a top plate flow passage 5B of the third embodiment, an outlet flow passage 53B is not open at the top surface 41 and is open at the inclined surface 44. The outlet flow passage 53B of the third embodiment extends to be perpendicular to the inclined surface 44.

A thinning flow passage 61 through which the cooling medium flows is formed inside a thinning 6B of the third embodiment.

The thinning flow passage 61 extends in the blade surface direction W inside the thinning 6B. The thinning flow passage 61 is connected to the cooling flow passage 10 or the top plate flow passage 5B. Accordingly, the cooling medium flows into the thinning flow passage 61 from the cooling flow passage 10 or the top plate flow passage 5B. The thinning flow passage 61 of the third embodiment has a circular shape and is formed to penetrate the middle of the thinning 6B in the cross section orthogonal to the camber line C.

According to the blade 1B of the above-described third embodiment, the outlet flow passage 53B is open at the inclined surface 44 connecting the top surface 41 and the side surface 43 to each other. Accordingly, after the cooling medium discharged from the outlet flow passage 53B to the outside of the top plate 4B flows along the inclined surface 44, the cooling medium can flow along the top surface 41 without peeling. As a result, it is possible to improve efficiency of cooling performed by the cooling medium flowing on the top surface 41 from the pressure side toward the suction side in the blade thickness direction Y along the flow of the combustion gas G. Accordingly, it is possible to cool the top plate 4B by more efficiently using the cooling medium discharged from the outlet flow passage 53B.

The cooling medium flows through the thinning flow passage 61 formed inside the thinning 6B, and thus, it is possible to intensively cool the thinning 6B by convection cooling. Accordingly, in addition to the cooling performed by the top plate flow passage 5B, the cooling can be performed by the thinning flow passage 61, and thus, it is possible to more effectively cool the thinning 6B.

Fourth Embodiment

Next, a blade of a fourth embodiment will be described with reference to FIG. 8.

In the fourth embodiment, the same reference numerals are assigned to components similar to those of the first to third embodiments, and detailed descriptions thereof are omitted. In the blade of the fourth embodiment, a configuration of a top plate flow passage is different from those of the first to third embodiments.

Figure 8:
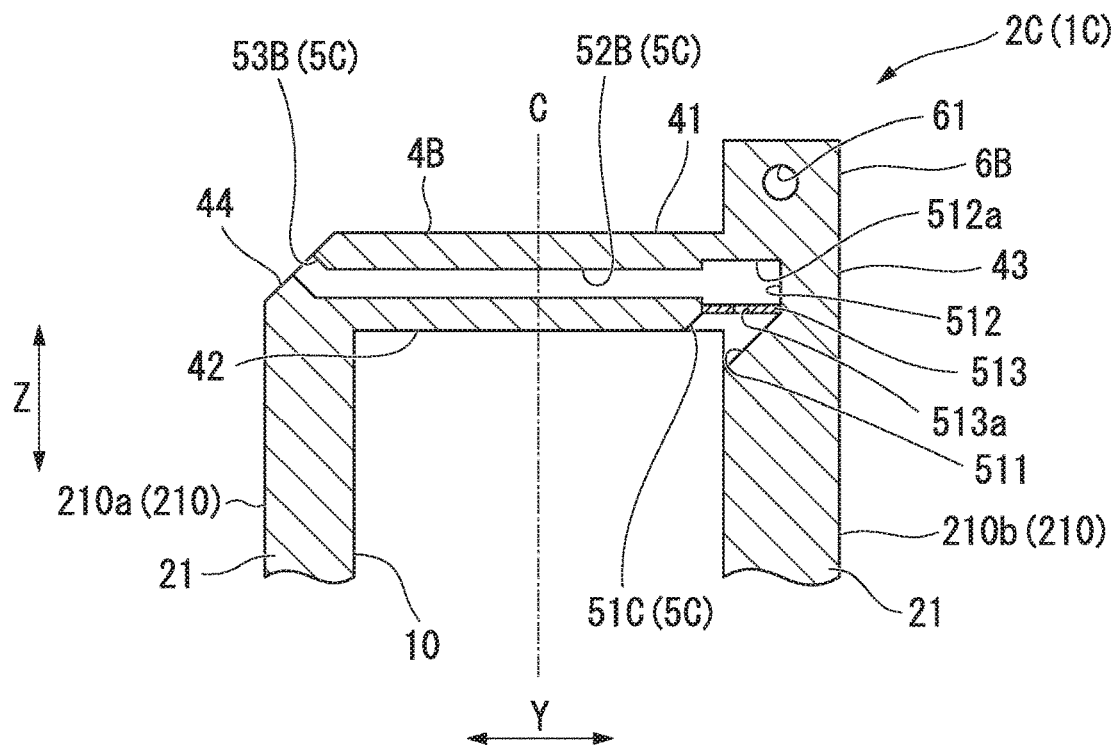
FIG. 8 is a sectional view of the top plate in the cross section orthogonal to the camber line, illustrating a top plate flow passage in a fourth embodiment.

In a blade 1C of the fourth embodiment, as shown in FIG. 8, in a top plate flow passage 5C of a blade body 2C, impingement cooling is performed by an inlet flow passage 51C. The inlet flow passage 51C of the fourth embodiment includes an introduction portion 511, a cooling portion 512, and an injection portion 513. The cooling medium flows into the introduction portion 511 from the cooling flow passage 10. The cooling portion 512 includes a cooling surface 512a formed to face one side in the blade height direction Z. The injection portion 513 includes an injection hole 513a which injects the cooling medium to the cooling surface 512a.

The introduction portion 511 is formed at a position closer to the suction side than the camber line C. The introduction portion 511 is open at the inner surface 42 of the top plate 4B. The inlet flow passage 51C of the present embodiment extends to be inclined toward the suction side with respect to the inner surface 42 as it extends toward the other side in the blade height direction Z in the cross section orthogonal to the camber line C.

The cooling portion 512 is connected to the introduction portion 511. The cooling portion 512 is connected to a main flow passage 52B. The cooling portion 512 includes a cooling surface 512a formed to face the inside in the radial direction Dr similarly to the inner surface 42.

The cooling surface 512a is a flat surface facing a side opposite to the top surface 41. The cooling surface 512a is formed at a position at which a position of the cooling surface 512a in the blade thickness direction Y at least partially overlaps the thinning 6 when viewed in the blade height direction Z. Specifically, the cooling surface 512a is formed at an interval in the blade height direction Z with respect to the thinning 6 such that the position of the cooling surface 512a in the blade thickness direction Y partially overlaps the thinning 6 in the cross section orthogonal to the camber line C.

The injection portion 513 is provided at a connection area between the cooling portion 512 and the introduction portion 511. The injection portion 513 of the fourth embodiment has a flat plate shape.

The injection hole 513a injects the cooling medium flowing in from the introduction portion 511 to the cooling surface 512a of the cooling portion 512. Accordingly, the injection hole 513a performs the impingement cooling on the cooling surface 512a. The injection hole 513a of the present embodiment is a circular through-hole which penetrates the injection portion 513. The injection hole 513a is formed in the injection portion 513 to inject the cooling medium toward the center of the cooling surface 512a. Accordingly, the cooling medium radially injected from the injection hole 513a comes into contact with the cooling surface 512a without being uneven.

According to the blade 1C of the fourth embodiment, the cooling medium which has flowed into the introduction portion 511 from the cooling flow passage 10 is injected from the injection hole 513a to the cooling surface 512a. The cooling medium injected from the injection hole 513a comes into contact with the cooling surface 512a while being radially spread from the injection hole 513a. Thereafter, the cooling medium flows through the main flow passage 52B and is fed to the outlet flow passage 53B.

Accordingly, the impingement cooling is performed on the cooling surface 512a formed at the position partially overlapping the thinning 6 when viewed in the blade height direction Z by the cooling medium injected from the injection hole 513a, and thus, the cooling surface 512a can be cooled. Accordingly, it is possible to more intensively cool the thinning 6 using the cooling medium. That is, it is possible to more effectively cool the thinning 6 using the cooling medium flowing through the top plate flow passage 5C.

Hereinbefore, the embodiments of the present invention have been described above in detail with reference to the drawings. However, the configurations, combinations thereof, etc. in the respective embodiments are merely examples, and additions, omissions, replacements, and other modifications of configurations are possible within the scope which does not depart from the gist of the present invention. In addition, the present invention is not limited by the embodiments and is limited only by claims.

For example, the top plate flow passage 5B of the third embodiment or the top plate flow passage 5C of the fourth embodiment may have the main flow passage 52A of the second embodiment which extends in a meandering manner. In addition, the top plate 4B in which the top plate flow passage 5C having the injection portion 513 of the fourth embodiment is formed may not have the thinning flow passage 61 or the inclined surface 44.

The thinning 6 is not limited to the structures of the present embodiments in which the surface facing the suction side is formed to be continuous to the suction-side outer surface 210b. The thinning 6 may protrude from the top surface 41 such that the surface facing the suction side is disposed at a position away from the suction-side outer surface 210b. In addition, the thinning 6 may be disposed across the camber line C.

INDUSTRIAL APPLICABILITY

In the above-described blade, it is possible to effectively cool the thinning and the top plate by efficiently using the cooling medium.

REFERENCE SIGNS LIST

100: gas turbine
Ao: outside air
A: compressed air
110: compressor
Ar: axis
111: compressor rotor
112: compressor casing
F: fuel
G: combustion gas
120: combustor
130: turbine
140: turbine rotor
141: rotor shaft
141a: rotor coolant passage
142: blade stage
1, 1A, 1B, 1C: blade
2, 2A, 2B, 2C: blade body
21: blade main body
X: chord direction
21a: leading edge portion
21b: trailing edge portion
210: outer surface
210a: pressure-side outer surface
210b: suction-side outer surface
Y: blade thickness direction
Z: blade height direction
W: blade surface direction
C: camber line
4, 4B: top plate
41: top surface
42: inner surface
5, 5A, 5B, 5C: top plate flow passage
51, 51C: inlet flow passage
52, 52A, 52B: main flow passage
53, 53A, 53B: outlet flow passage
6, 6B: thinning
10: cooling flow passage
11: leading edge portion opening hole
3: platform
3a: gas pass surface
40: shank
50: blade root 143: vane stage
143a: vane
150: turbine casing
151: outer casing
152: inner casing
152a: casing coolant passage
153: ring segment
101: gas turbine rotor
102: gas turbine casing
GEN: generator
Da: axial direction
Dc: circumferential direction
Dr: radial direction
Pg: combustion gas flow passage
521: first straight line portion
522: first return portion
523: second straight line portion
524: second return portion
525: third straight line portion
43: side surface
44: inclined surface
61: thinning flow passage
511: introduction portion
512: cooling portion
512a: cooling surface
513: injection portion
513a: injection hole

The invention claimed is:

1. A blade, comprising a blade body inside which a cooling flow passage through which a cooling medium is configured to flow is defined,
wherein the blade body includes:
a top plate on a blade end portion of the blade body in a blade height direction; and
a thinning which is defined on a top surface of the top plate facing an outside in the blade height direction, closer to a suction side of the blade body than a camber line of the blade body, and which protrudes toward the outside in the blade height direction and extends along the camber line,
wherein a top plate flow passage through which the cooling medium from the cooling flow passage is configured to flow is defined inside the top plate,
wherein the top plate flow passage includes:
an inlet flow passage which is closer to the suction side than the camber line and into which the cooling medium is configured to flow from the cooling flow passage;
a main flow passage which is connected to the inlet flow passage and extends in a direction intersecting the camber line along the top surface; and
an outlet flow passage which is connected to the main flow passage and through which the cooling medium is configured to be discharged to an outside of the blade body from a position closer to a pressure side of the blade body than the camber line,
wherein the top plate includes an inclined surface connecting a surface facing the pressure side of the blade body and the top surface to each other,
wherein the outlet flow passage is open at the inclined surface, and
wherein the inclined surface is inclined with respect to the surface facing the pressure side of the blade body and the top surface.

2. The blade according to claim 1, wherein the inlet flow passage is defined at a position closer to the thinning than the camber line when viewed in the blade height direction.

3. The blade according to claim 1, wherein the outlet flow passage is defined at a position closer to an outer surface of the blade body facing the pressure side than the camber line when viewed in the blade height direction.

4. The blade according to claim 1, wherein the main flow passage is defined in a meandering manner in a cross section parallel to the top surface.

5. The blade according to claim 1, wherein a thinning flow passage through which the cooling medium is configured to flow is defined inside the thinning.

6. The blade according to claim 1, wherein the inlet flow passage includes:
a cooling surface that is at a position at which the cooling surface at least partially overlaps the thinning when viewed in the blade height direction and that faces a side opposite to the outside in the blade height direction; and
an injection portion in which an injection hole through which the cooling medium is configured to be injected to the cooling surface is defined.

7. The blade according to claim 1, further comprising a platform on an end portion of the blade body on a side opposite to the outside in the blade height direction.

8. A gas turbine, comprising:
a combustor configured to generate a combustion gas; and
a turbine which includes the blade according to claim 1.

9. The blade according to claim 1, wherein the inclined surface is inclined at 45° with respect to the surface facing the pressure side of the blade body and the top surface.

* * * * *